(12) United States Patent
Wood et al.

(10) Patent No.: US 11,944,853 B2
(45) Date of Patent: Apr. 2, 2024

(54) ROPE ANCHOR

(71) Applicant: Sherrill, Inc., Greensboro, NC (US)

(72) Inventors: Caitlin J Wood, Westbrook, ME (US); Alexander P Stroshane, Gorham, ME (US); Joshua Walls, Lyman, ME (US)

(73) Assignee: Sherrill, Inc., Greensboro, NC (US)

( * ) Notice: Subject to any disclaimer, the term of this patent is extended or adjusted under 35 U.S.C. 154(b) by 195 days.

(21) Appl. No.: 17/446,001

(22) Filed: Aug. 26, 2021

(65) Prior Publication Data
US 2023/0065216 A1 Mar. 2, 2023

(51) Int. Cl.
*A62B 35/00* (2006.01)

(52) U.S. Cl.
CPC ...... *A62B 35/0068* (2013.01); *A62B 35/0037* (2013.01)

(58) Field of Classification Search
CPC combination set(s) only.
See application file for complete search history.

(56) References Cited

U.S. PATENT DOCUMENTS

| | | | |
|---|---|---|---|
| 1,050,479 A | 1/1913 | Long | |
| 1,160,016 A | 11/1915 | Utsman | |
| 2,398,464 A | 10/1944 | Salisbury | |
| D271,466 S * | 11/1983 | Boissonnet | D8/367 |
| 4,691,416 A * | 9/1987 | Nakayama | A47C 31/026 24/601.2 |
| 5,913,479 A * | 6/1999 | Westwood, III | F16B 45/02 24/600.9 |
| 7,874,034 B1 * | 1/2011 | Mack | B25B 13/02 7/138 |
| 8,261,877 B2 | 9/2012 | Botti | |
| 9,494,183 B2 * | 11/2016 | Botti | A62B 1/16 |
| 9,677,597 B2 * | 6/2017 | Yoo | F16B 45/02 |
| 10,265,554 B2 | 4/2019 | Colorado | |
| 2011/0232994 A1 | 9/2011 | Broyles | |
| 2016/0317849 A1 * | 11/2016 | Cowell | F16G 15/06 |
| 2018/0272163 A1 | 9/2018 | Colorado | |

OTHER PUBLICATIONS

Written Opinion of PCT Appl. No. PCT/US2022/074515 dated Oct. 25, 2022.

* cited by examiner

*Primary Examiner* — Monica E Millner
(74) *Attorney, Agent, or Firm* — Steven K Martin (57) ABSTRACT

A rope anchor with a J-shaped a body having a hook and spine. The end of the spine has an attachment hole for a rope and an elongated, teardrop-shaped rope slot that is either enclosed or gated. The gate is biased closed to span the open side of the rope slot and pushed opened to allow access for a rope. A tip, composed of a flat chip of metallic material, fits into a slot at the end of the hook. The tip is generally triangular with two or three sharp corners, or square or rectangular with four sharp corners. The slot orients the tip so that only one of the sharp corners is exposed, or so that two adjacent sharp corners are exposed. When an exposed sharp corner is not suitable for use, the tip can be reoriented to expose a different sharp corner.

17 Claims, 14 Drawing Sheets

ROPE ANCHOR

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present relates generally to apparatus for performing a controlled rope descent from height, more particularly to a rope anchor.

2. Description of the Related Art

Firefighters routinely enter burning buildings to search for victims and locate the source of the fire. In the event that they cannot exit the way they entered, many are outfitted with emergency escape systems that allow them to exit through a window or from the roof. The systems are a last resort and rarely deployed but must be carried, specifically in an easy to access pocket or bag. The systems typically include a hook-like anchor, rope, descent device, and carabiner to connect the descent device to the belt or harness of the firefighter.

It is an important function of the anchor to securely attach the rope to the structure or apparatus. It has been shown that without a sharp tip, the anchor may release from the sill. Also, improperly holding the hook for anchor placement, because of ergonomics or lack of training, can lead to unsecure anchoring. During firefighter bailout training, prior to deployment in an emergency scenario, the sharp tip of the anchor may become dull if used on common building material edges, like masonry, brick, or concrete, thereby becoming less effective in an emergency deployment. Anchors with replaceable tips have been developed to solve this problem.

There has also been continued innovation related to solid and gated hitching slots to allow for multiple emergency uses of the anchor device, such as anchoring around a secure point away from the windowsill or lowering another person using the anchor as a friction-based belay device. Limitations of prior art anchors include chafing of the rope when wrapped around the anchor in these different configurations if the rope passes over sharp edges while carrying a load.

BRIEF SUMMARY OF THE INVENTION

The rope anchor of the present invention has a body and tip. The body has a J shape, with a hook and a spine extending generally tangentially from one end of the hook. The inside surface of the hook is the saddle. Optionally, for weight saving, the body has a plurality of weight-saving regions that are thinner than the rest of the body. Optionally, the inside edge is thicker than the rest of the body thereby forming a rib. Optionally, the hook has an elongated tab slot along the outside edge that can be used for attaching a pull tab to facilitate deploying the anchor from a pocket or bag.

The attachment end of the spine has an attachment hole, typically for attaching the rope being suspended by the anchor. Optionally, the area of the spine between the attachment hole and the attachment end is thinner than the rest of the spine surrounding the attachment hole to guide the rope attachment away from the inner edge of the spine, so it does not get trapped or pinched.

On the outside of the spine is an elongated rope slot. In one configuration, the rope slot is enclosed. In another configuration, the rope slot is structured like a carabiner with a gate. The rope slot has a teardrop, oval, or other rounded elongated shape. The gate can have any structure that is biased closed to span the open side of the rope slot, and that can be pushed opened to allow access to the rope slot for a rope. Examples known in the art include a pivoting arm with a leaf spring, a reciprocating plunger with a compression spring, and a steel wire bent into an elongated U.

The tip is a flat chip of a hard, preferably metallic, material, such as stainless steel. In one configuration, the tip is generally triangular with two or three sharpened corners. The remaining corner is rounded for safety during handling. In another configuration, the tip is generally square or rectangular and all four corners are sharp. The present invention contemplates that one or more corners can be exposed to bite into the surface. The sharp corners can have any sharpened configuration. In one configuration, the sharp corners have a sharp straight edge. In another configuration, the sharp corners come to a point.

The tip fits into and is secured in a slot in the tip end of the hook by any acceptable means. In the present design, the tip is secured in the slot by a screw. Optionally, the slot orients the tip so that only one of the sharp corners is exposed. Optionally, the slot orients the tip so that two adjacent sharp corners are exposed. The tip is oriented by the slot so that the exposed sharp corner points generally to the attachment end.

The slot has an inner wall against which the tip abuts in order to prevent the tip from rotating and to transfer some load from the tip to the body. Optionally, the tip and slot are keyed so that the tip is not installed incorrectly.

The anchor of the present invention carries its own replacement tip. When an exposed sharp corner is worn or otherwise not suitable for use in the present situation, the tip can be reoriented to expose a different sharp corner. Reorienting is done by removing the screw, sliding the tip from the slot, and rotating or flipping the tip to expose a different sharp corner.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

The rope anchor 10 of the present invention has a body 12 and tip 14.

Figure 2:
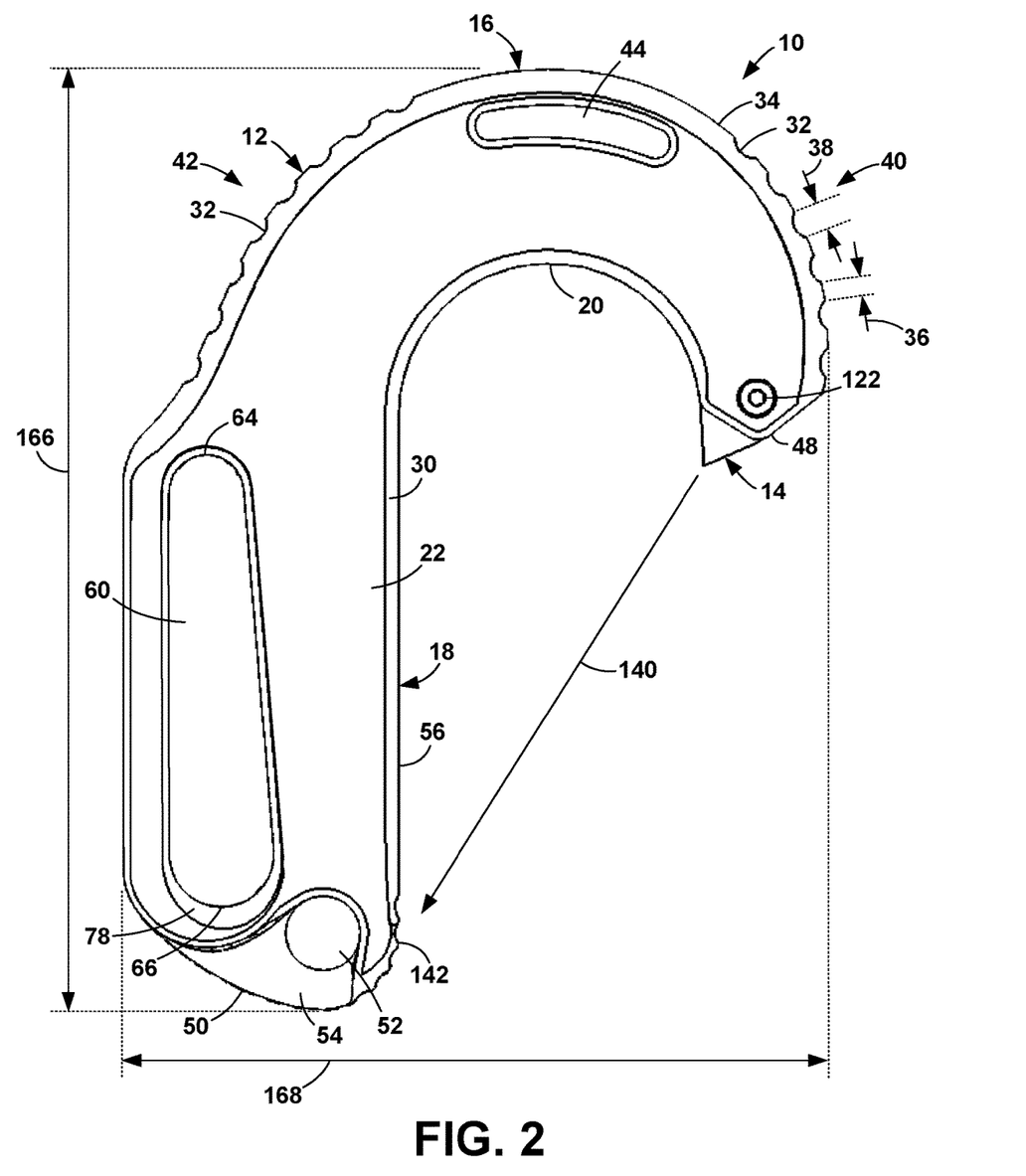
FIG. 2 is a side view of the anchor with no thin regions and an enclosed rope slot.
Figure 3:
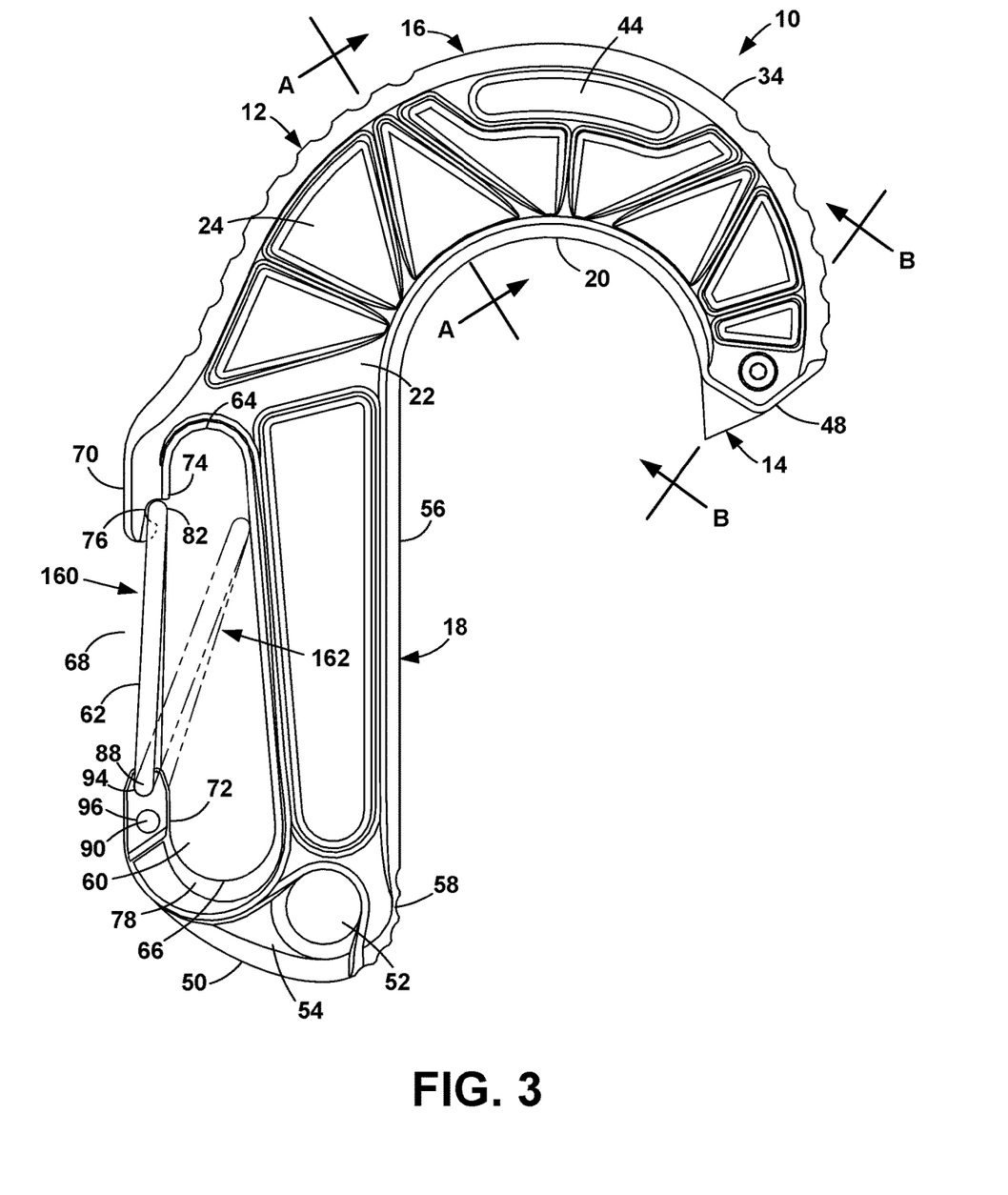
FIG. 3 is a side view of the anchor with the gated rope slot showing the gate closed and open in phantom.

The body 12, shown in FIGS. 2 and 3, has a J shape, with a hook 16 and a spine 18 extending generally tangentially from one end of the hook 16. The inside surface of the hook 16 is the saddle 20. The body 12 is generally flat with opposed sides 22. The body 12 is composed of a rigid material, such as a plastic carbon composites, or metal alloy. The preferred material is an aluminum alloy that is machined or forged.

Figure 1:
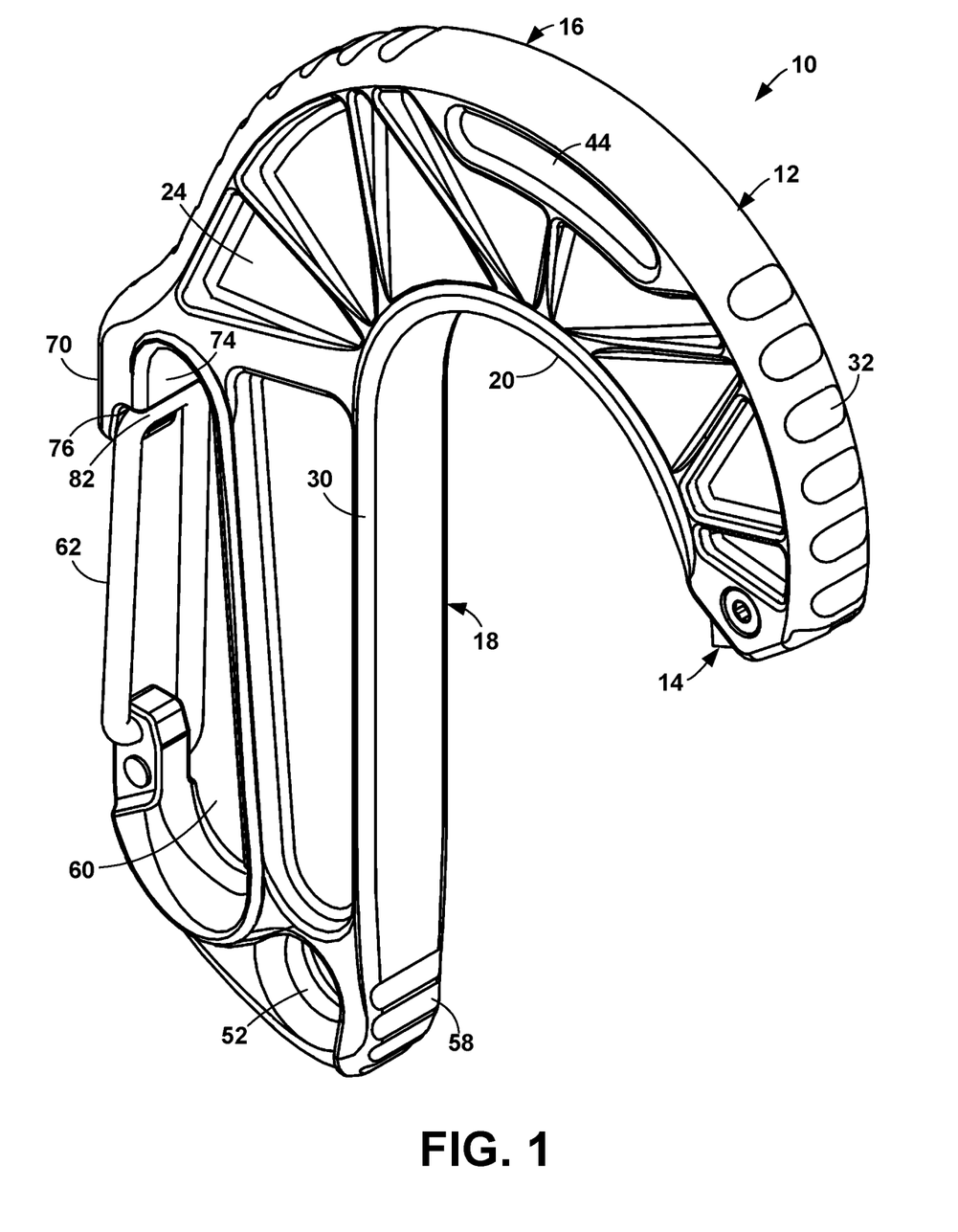
FIG. 1 is a perspective view of the rope anchor of the present invention.

Optionally, for weight saving, the body 12 has a plurality of weight-saving regions 24 in the sides 22 that are thinner than the rest of the body 12, as in FIGS. 1 and 3. Optionally, as in FIG. 5, the thickness of the regions 24 increases from narrower at the outer portion, as at 26, to wider at the inner portion, as at 28. Typically, the wider portion 28 will be the same as the base thickness of the body 12, which is found near the outer edge 34. This non-constant thickness provides weight savings while maintaining robustness and rigidity. Alternatively, the weight-saving regions 24 are through openings.

Figure 5:
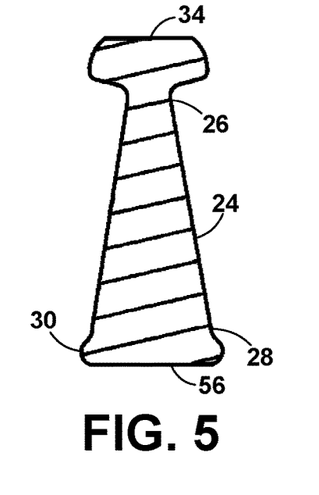
FIG. 5 is a cross-sectional view of the body taken at A-A of FIG. 3.

Optionally, the inside edge 56 is thicker than the rest of the body 12 thereby forming a rib 30 to provide stiffness, as in FIG. 5.

Optionally, the outside edge 34 of the body 12 is textured to provide a grip for a user when setting the anchor 10. In the illustrated configuration, there is one or more sets of parallel, lateral depressions 32 along the outside edge 34 of the body 12. The depressions 32 are spaced apart, as at 36, by approximately the width 38 of the depressions 32. In the illustrated configuration, there is one set 40 of depressions 32 adjacent to the tip end 48 of the hook 16 and another set 42 of depressions 32 adjacent to the spine 18.

Alternatively, the texturing can take the form of knurling or otherwise roughening the outside edge 34.

Optionally, the hook 16 has an elongated tab slot 44 that curves along the outside edge 34 of the hook 16. The tab slot 44 can be used for attaching a pull tab 4, as in FIG. 16, to facilitate deploying the anchor 10 from a pocket or bag. The pull tab 4 can be composed of a webbing or other similar construct. The webbing can be composed of polyester, aramid, polyamide, or other similar materials.

Figure 16:
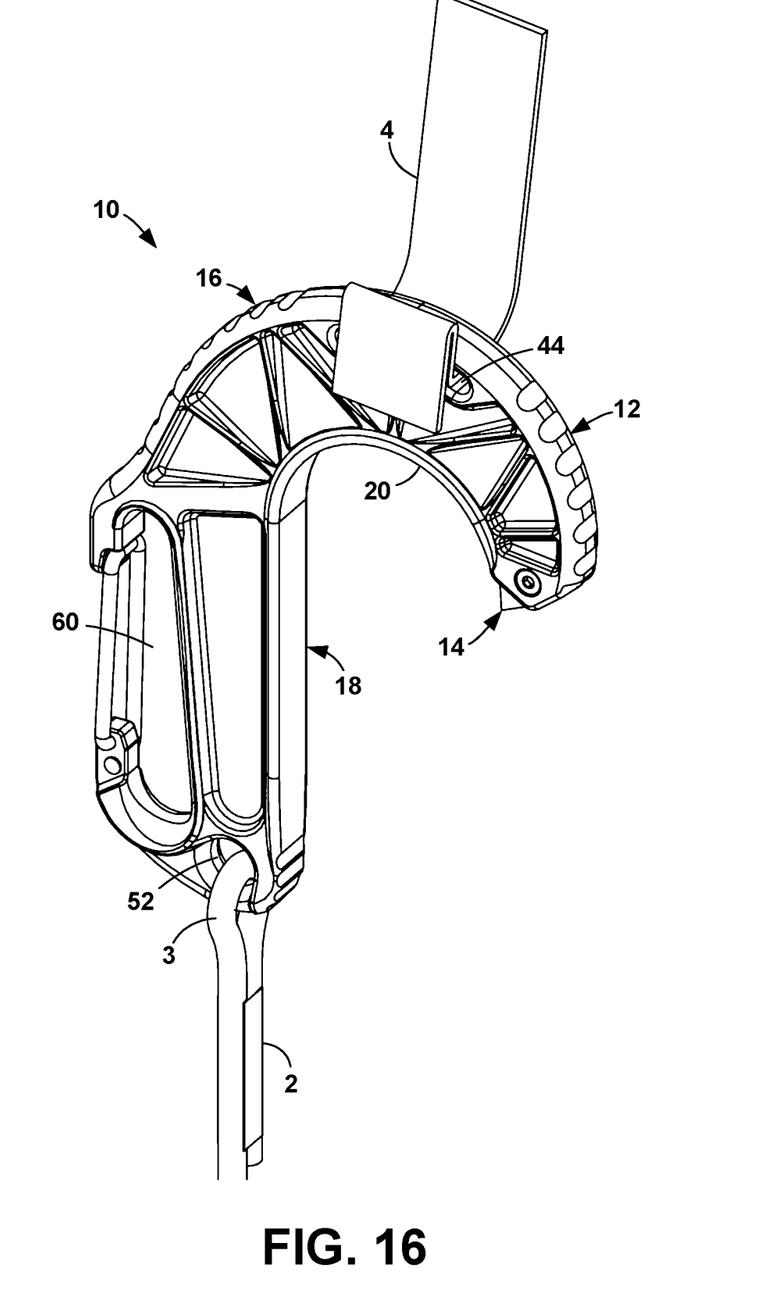
FIG. 16 is perspective view of the anchor with external components attached.

As mentioned above, the spine 18 extends generally tangentially and straight from one end of the hook 16. The attachment end 50 of the spine 18 has an attachment hole 52, typically for attaching the rope 2 being suspended by the anchor 10. The present invention contemplates any acceptable method for attaching the rope, such as by a carabiner, quick link, crimped or clamped eye, or other method. In FIG. 16, the rope 2 is shown as being attached to the attachment hole 52 by a sewn eye 3. Typically, the attachment hole 52 is round with a diameter larger than the diameter of the rope 2, carabiner, or quick link with which it is intended to be used.

Optionally, the inside edge 56 of the body at the attachment end 50 has depressions 58 similar to the depressions 32 described above. These depressions 58 provide a grip for the anchor 10 against a surface that the spine 18 abuts during use.

Optionally, the area 54 of the spine 18 between the attachment hole 52 and the attachment end 50 is thinner than the rest of the spine 18 surrounding the attachment hole 54. The thinner area 54 guides the rope attachment (the rope eye 3 in FIG. 16) away from the inner edge 56 of the spine 18 so it does not get trapped or pinched.

On the outside of the spine 18 is an elongated rope slot 60. In the configuration of FIG. 2, the rope slot 60 is enclosed with the proximal slot end 64 closer to the hook 16 being narrower than the distal slot end 66 farther from the hook 16, so the rope slot 60 has a teardrop shape. Alternatively, the rope slot 60 can be oval or other rounded elongated shape.

In the configuration of FIG. 3, the rope slot 60 is structured like a carabiner with a gate 62. The rope slot 60 of FIG. 3 has an open side 68 and rounded ends 64, 66. The open side 68 is between a proximal finger 70 closer to the hook 16 and a distal finger 72 farther from the hook 16. The proximal slot end 64 is narrower than the distal slot end 66, so the rope slot 60 has a teardrop shape.

The surface 78 of the distal end 66 of the rope slot 60 is rounded in cross-section to provide a smooth surface for a rope to slide over without catching or abrading.

The gate 62 can have any structure that is biased closed, as at 160, to span the open side 68, and that can be pushed opened to allow access to the rope slot 60 for a rope. Examples known in the art include a pivoting arm with a leaf spring and a reciprocating plunger with a compression spring. In the illustrated design of FIG. 4, the gate 62 is a stainless steel wire 80 that is bent into an elongated U with a crossbar 82, a pivot leg 84 generally perpendicular to the cross bar 82, and a spring leg 86 generally parallel to and longer than the pivot leg 84. The pivot leg 84 has a foot 88 bent toward the spring leg 86 and generally parallel to the cross bar 82. The spring leg 86 has a foot 90 bent toward the pivot leg 84 and generally parallel to the cross bar 82.

Figure 4:
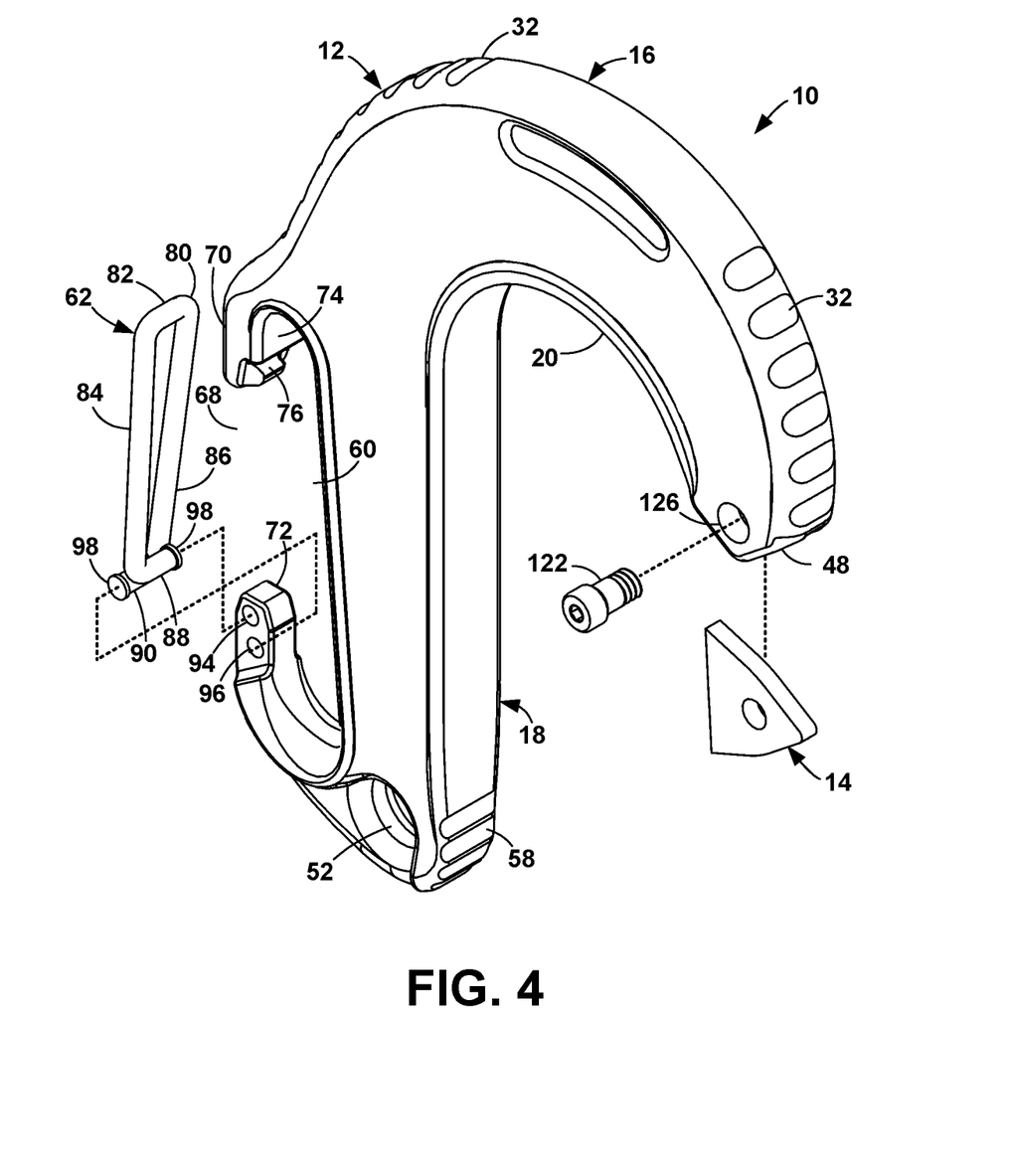
FIG. 4 is an exploded view of the anchor.

The pivot leg foot 88 is captured within a lateral through pivot hole 94 in the distal finger 72 and the spring leg foot 90 is captured within a lateral through spring hole 96 in the distal finger 72 distal of the pivot hole 94, as in FIGS. 3 and 4. The diameter of the holes 94, 96 is slightly larger than the diameter of the feet 88, 90 so that the feet 88, 90 can pivot freely within the holes 94, 96. After the feet 88, 90 are inserted into the holes 94, 96 during assembly, the ends of the feet 88, 90 are widened, as at 98 in FIG. 4 so that they are retained in the holes 94, 96. Typically, the feet 88, 90 are peened to make the ends wider, but any method can be used to retain the feet 88, 90 in the holes 94,96.

In its normal state, the gate 62 is biased closed, as at 160 in FIG. 3. When the gate 62 is pushed into the rope slot 60 into the open position, as at 162 in phantom of FIG. 3, the gate 62 pivots on both the pivot leg foot 88 and the spring leg foot 90. Because the feet 88, 90 are fixed relative to each other, the crossbar 82 twists, acting like a torsion spring to bias the gate 62 out of the rope slot 60. When the pushing pressure is released, the twisted crossbar 82 tries to pivot the gate 62 back out of the rope slot 60. Rather than pivot out of the rope slot 60, the crossbar 82 is stopped by the inner surface 74 of the proximal finger 70. Optionally, the crossbar 82 fits into a lateral groove 76 in the inner surface 74 of the proximal finger 70, as in FIGS. 1 and 3.

Figure 6:
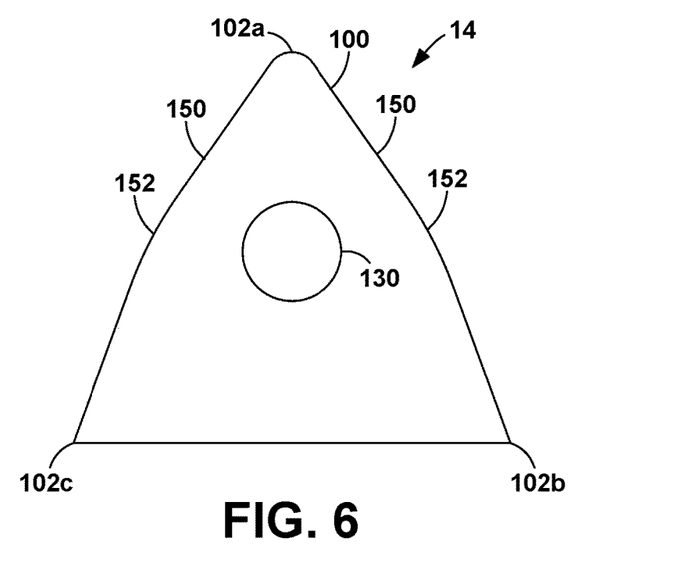
FIG. 6 is a side view of a two sharp corner configuration of the tip.
Figure 7:
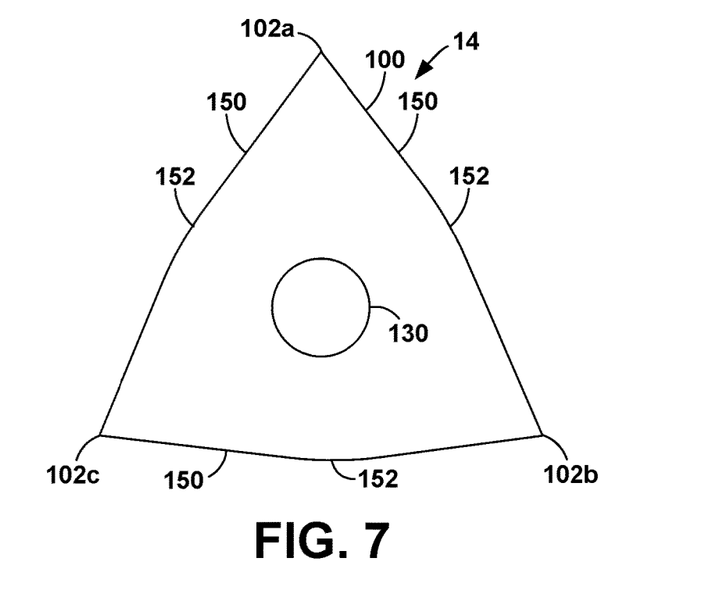
FIG. 7 is a side view of a three sharp corner configuration of the tip.
Figure 8:
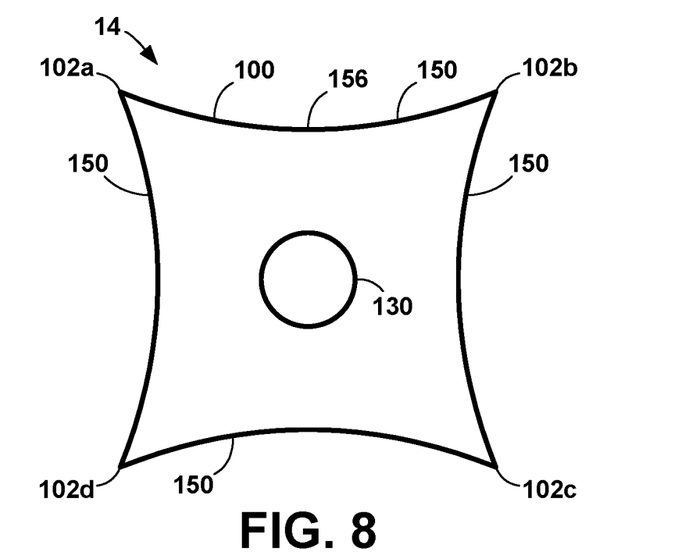
FIG. 8 is a side view of a square four sharp corner configuration of the tip.
Figure 9:
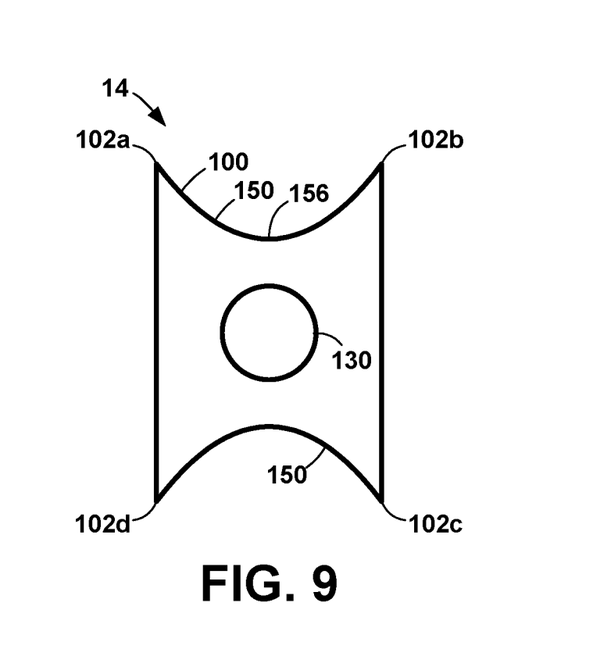
FIG. 9 is a side view of a rectangular four sharp corner configuration of the tip.

The tip 14 is shown in several configurations in FIGS. 6-11. The tip 14 is a flat chip 100 of a hard, preferably metallic, material, such as stainless steel. In the configuration of FIG. 6, the tip 14 is generally triangular. Two corners 102b, 102c are sharpened to be able to bite into a surface to maintain the position of the anchor 10, as described below, and one corner 102a is rounded for safety during handling. In the configuration of FIG. 7, the tip 14 is generally triangular and all three corners 102a, 102b, 102c are sharp. In the configuration of FIG. 8, the tip 14 is generally square and all four corners 102a, 102b, 102c, 102d are sharp. In the configuration of FIG. 9, the tip 14 is generally rectangular and all four corners 102a, 102b, 102c, 102d are sharp. The present invention contemplates any shape and combinations of rounded and sharp corners where the sharp corners can bite into a surface, as described below.

The present invention contemplates that one or more corners 102 can be exposed to bite into the surface. In the tip configurations of FIGS. 6-8, only one tip 102 is exposed, as in FIG. 14, to bite into the surface. In the tip configuration of FIG. 9, two adjacent tips 102a, 102b are exposed, as in FIG. 15, to bite into the surface.

Figure 10:
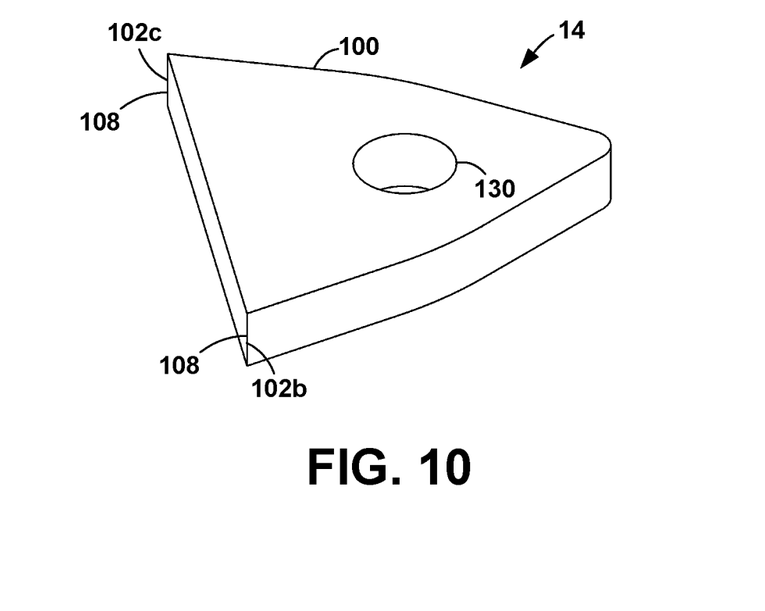
FIG. 10 is a perspective view of a tip with two sharp edges.
Figure 11:
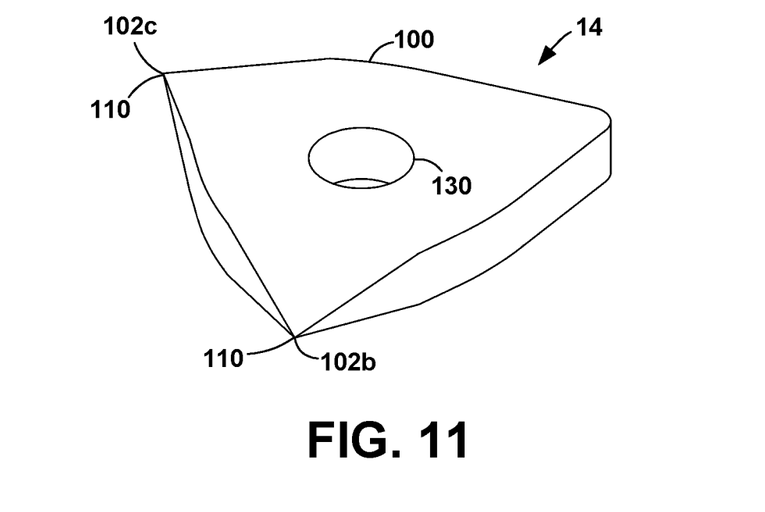
FIG. 11 is a perspective view of a tip with two sharp points.
Figure 12:
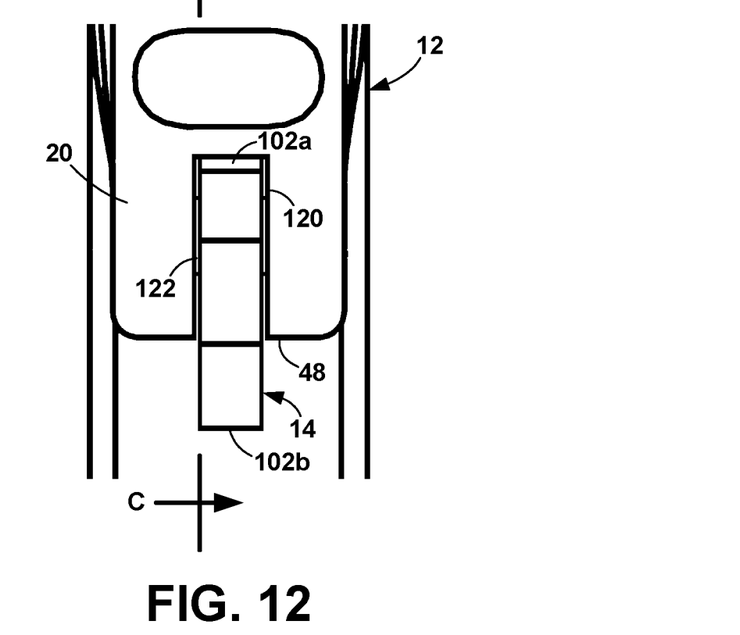
FIG. 12 is an edge view of the tip slot and tip.

The sharp corners can have any sharpened configuration. In the configuration of FIG. 10, the sharp corners 102b, 102c have a sharp straight edge 108. In the configuration of FIG. 11, the sharp corners 102b, 102c come to a point 110. The present invention contemplates that different sharp corners of a tip 14 can have different sharpened configurations.

Figure 13:
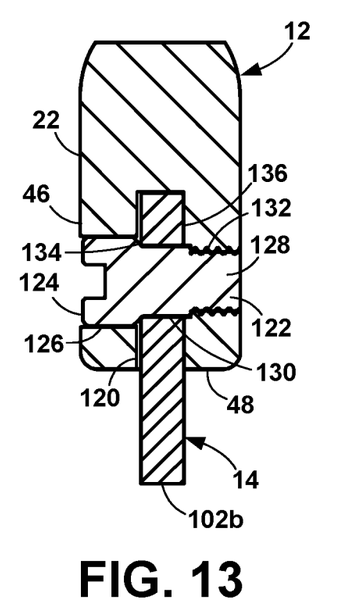
FIG. 13 is a cross-sectional edge view of the hook and tip taken at B-B of FIG. 3.

The tip 14 fits into a slot 120 in the tip end 48 of the hook 16, as shown in FIGS. 12-15. The tip 14 can be secured in the slot 120 by any acceptable means. In the present design, the tip 14 is secured in the slot 120 by a screw 122, as shown in FIG. 13. The screw 122 fits into a hole 126 in the hook 16 on one side of the slot 120. The hole 126 is large enough to accommodate the screw head 124 so that the screw head 124 is flush with or recessed into the surface 46 of the hook 16. The screw body 128 extends through a hole 130 in the tip 14 and turns into a threaded hole 132 in the hook 16 on the other side of the slot 120.

The screw shoulder 134 between the screw head 124 and body 128 pushes the tip 14 against the side wall 136 of the slot 120 so that the tip 14 does not move laterally within the slot 120. Optionally, the screw shoulder 134 is beveled, as shown in FIG. 13. The beveled shoulder 134 pushes into the tip hole 130 to stabilize the tip 14 to prevent it from moving around in the slot 120.

Optionally, the threaded hole 132 is within a metallic insert that is press fit into a hole in the hook 16.

Figure 14:
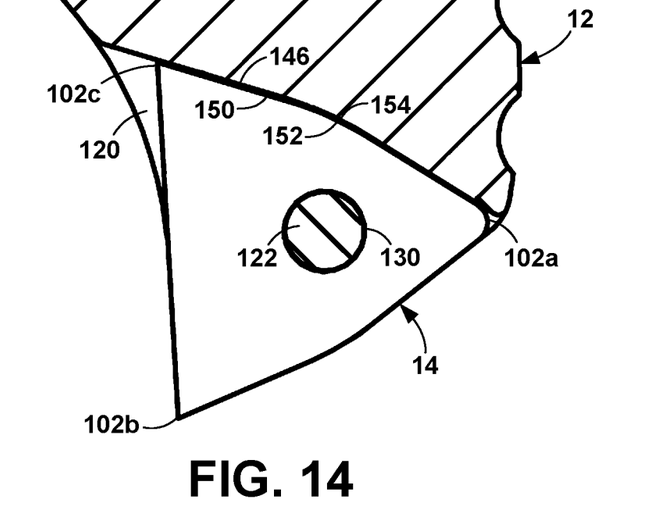
FIG. 14 is a cross-sectional side view of the tip slot and tip taken at C-C of FIG. 12.

Optionally, as shown in FIG. 14, the slot 120 orients the tip 14 so that only one of the sharp corners 102b is exposed, and so that the other sharp corners 102c are sheathed within the slot 120 so that they are not exposed to potentially cause injury or damage, or to be damaged.

Figure 15:
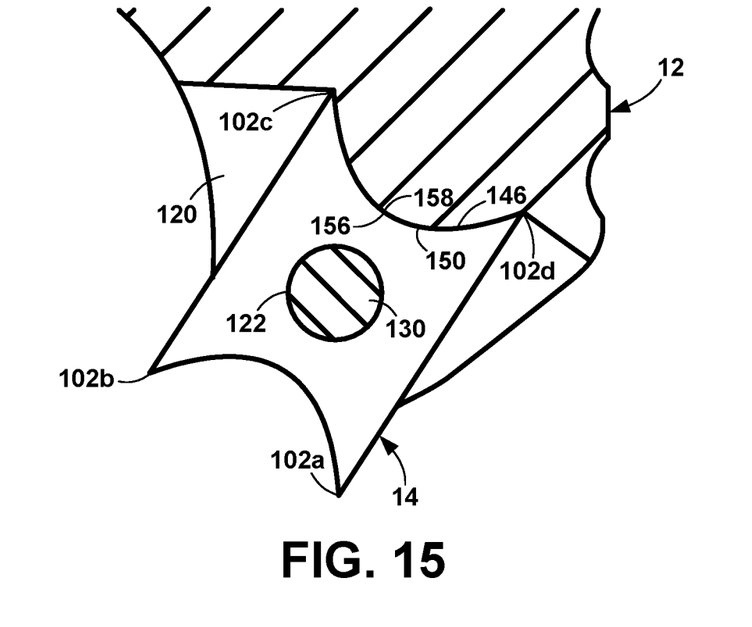
FIG. 15 is a cross-sectional side view of the tip slot and tip of FIG. 9.

Optionally, as shown in FIG. 15, the slot 120 orients the tip 14 so that two adjacent sharp corners 102a, 102b are exposed and the other sharp corners 102c, 102d are sheathed within the slot 120 so that they are not exposed to potentially cause injury or damage, or to be damaged.

The tip 14 is oriented by the slot 120 so that the exposed sharp corner 102b points generally to the attachment end 50, as at 140 in FIG. 2. This contact point 142 of the anchor 10 is where the spine 18 typically contacts the wall 6 when in use, as described below.

The slot 120 has an inner wall 146 against which the tip 14 abuts, shown in FIGS. 14 and 15. The inner wall 146 is generally perpendicular to the direction that the exposed sharp corner 102b is pointing. The tip 14 abutting the perpendicular inner wall 146 provides two functions. In one, the tip 14 is prevented from rotating about the screw 122 relative to the body 12. Second, some of the load is transferred to the body 12. When the anchor 10 is in use, pressure (load) on the tip 14 is transferred to the screw 122. With the tip 14 abutting the inner wall 146, a portion of the load is transferred to the body 12 through the inner wall 146.

Optionally, the tip 14 and slot 120 are keyed so that the tip 14 is not installed incorrectly. In the configuration of FIGS. 6 and 7, the keying takes the form of a convex bend 152 in selected sides 150 of the tip 14. The bend 152 fits into a matching concave bend 154 in the slot inner wall 146, as in FIG. 14. With the configuration of FIGS. 8 and 9, the keying takes the form of a concave bend 156 in selected sides 150 and a matching convex bend 158 in the slot inner wall 146, as in FIG. 15. The present invention contemplates that any other form of keying can be used.

The anchor 10 of the present invention carries its own replacement tip 14. As described above, the tip configuration of FIG. 6 has two sharp corners 102b, 102c, and only one of the corners 102b is exposed. When the exposed sharp corner 102b is worn or otherwise not suitable for use in the present situation, the tip 14 can be reoriented to expose a different sharp corner 102c. Reorienting is done by removing the screw 122, sliding the tip 14 from the slot 120, and realigning the tip 14 depending on its shape. Referring to FIG. 14, the tip 14 is realigned by flipping it vertically. The tip 14 is then reinserted into the slot 120 so that the worn sharp corner 102b is sheathed and the other sharp corner 102c is exposed, and the screw 122 is reinstalled.

In the tip configuration of FIGS. 7 and 8, where all of the corners 102 are sharp, the tip 14 is realigned by rotating the tip 14 about the screw hole 130. In the double tip configuration of FIG. 9, the tip 14 is flipped over.

The present invention contemplates that the anchor 10 can be any size adequate for the intended function. In the present design, the height 166 is approximately 6.2" and the width 168 is approximately 4.7". The base thickness is 0.45" and widens to 0.55" at the rib 30 along the inside of the spine 18 and saddle 20. The weight saving regions 24 decrease in thickness by 0.1", 0.125", or 0.15", depending on the particular region 24, to a thickness at the thinner end 26 ranging from 0.15" to 0.25". The thickness of the thicker end 28 is about the same as the base thickness, 0.45".

FIG. 16 illustrates a typical configuration of the hook 10. A pull tab 4 is assembled to the tab slot 44 as it would be installed in a storage bag or pocket. The rope 2 is assembled to the attachment hole 52 by a sewn eye 3.

Figure 17:
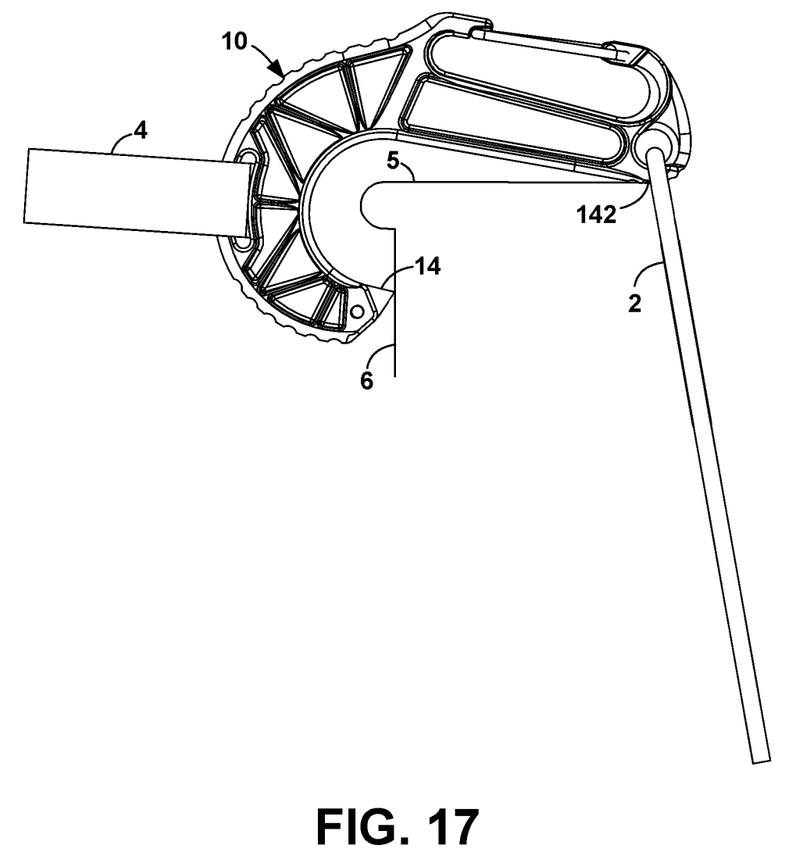
FIG. 17 shows one method of using the anchor.

FIGS. 17-20 illustrate several different methods of using the anchor 10. FIG. 17 shows the hook 10 as it would be deployed as a sill anchor. The tip 14 is engaged with the wall 6 inside a windowsill and the contact point 142 is abutting the horizontal surface 5 of the windowsill. The rope 2 extends out the window and down for the user to rappel on.

Figure 18:
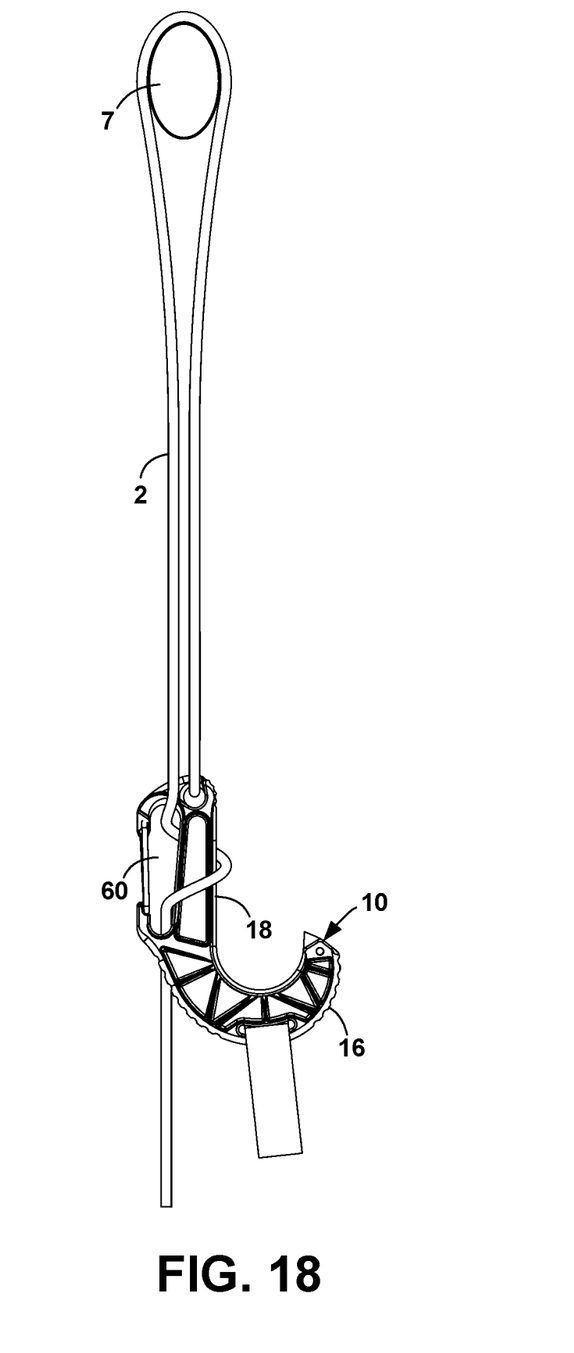
FIG. 18 shows another method of using the anchor.

FIG. 18 shows how the anchor 10 is used in a remote anchor scenario around a fixture 7 within the structure. The rope 2 is looped around the fixture 7 and hitched or clipped through the rope slot 60 and around the spine 18 so the user can progress out the window and descend on the rope 2.

Figure 19:
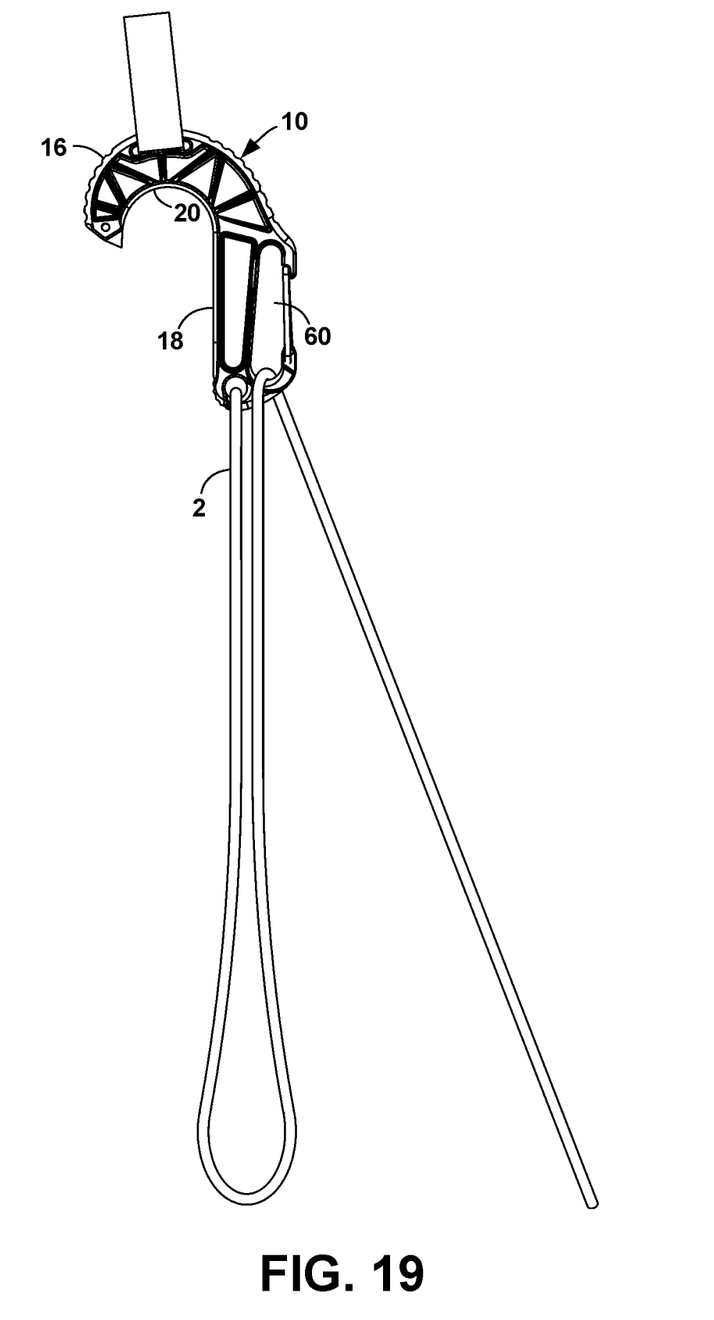
FIG. 19 shows another method of using the anchor.

FIG. 19 shows how the anchor 10 is used for raising a body. The hook 16 is anchored, optionally by the saddle 20. The rope 2 is attached to the body, and then clipped into the rope slot 60. This produces a 2:1 mechanical advantage with redirect operating as a hoist.

Figure 20:
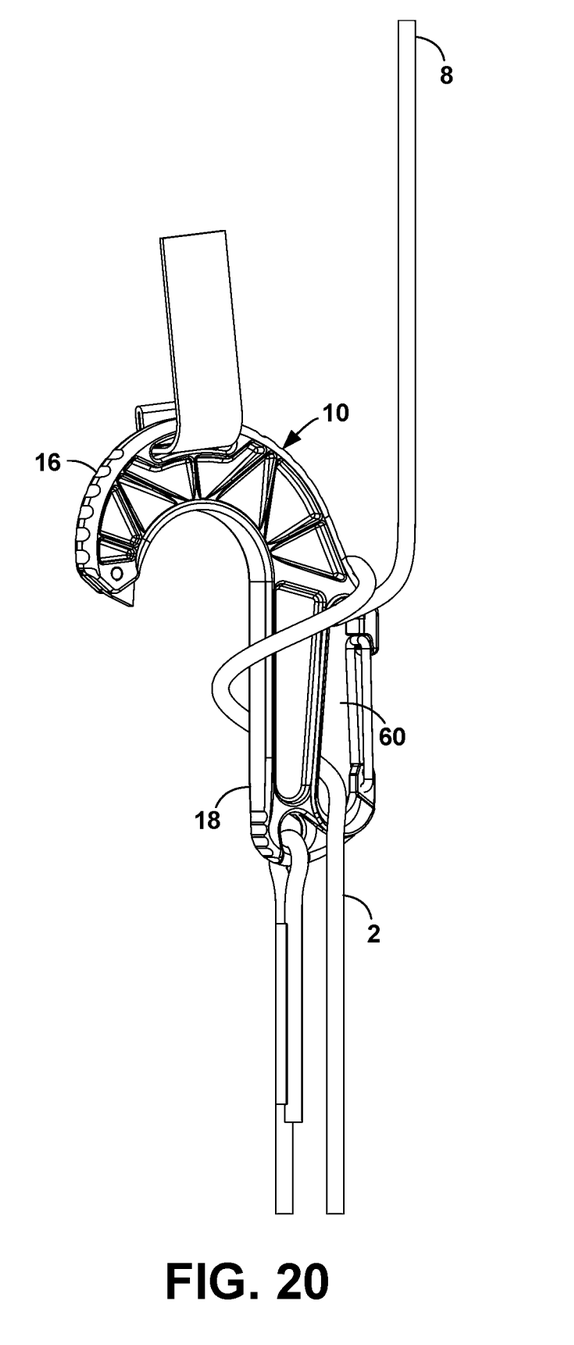
FIG. 20 shows another method of using the anchor.

FIG. 20 shows a partner lowering method, commonly known as the Byrne Technique, wherein the anchor 10 is used as a friction belay device. The partner is attached to the distal end 8 of the rope 2, which is then clipped or hitched through the rope slot 60. The user lowers the partner, then is able to use the anchor 10 and their attached descent device to also descend from the proximal end of the rope 2.

Thus, it has been shown and described a rope anchor. Since certain changes may be made in the present disclosure without departing from the scope of the present invention, it is intended that all matter described in the foregoing specification and shown in the accompanying drawings be interpreted as illustrative and not in a limiting sense.

The invention claimed is:

1. A rope anchor comprising:
   (a) a J-shaped body composed of a rigid material, the body including a hook with a tip end and a spine extending generally tangentially from the other end of the hook to a rope end;
   (b) a flat tip having a plurality of sharp corners, the tip replaceably mounted securely within a tip slot in the tip end such that at least one of the sharp corners is exposed, the tip and tip slot designed such that the tip can be removed, reoriented, and reinstalled in the tip slot to expose a different one of the sharp corners;
   (c) an attachment hole adjacent to the rope end of the spine.

2. The rope anchor of claim 1 wherein the sharp corners that are not exposed are sheathed within the tip slot.

3. The rope anchor of claim 1 wherein at least one sharp corner has a straight sharp edge.

4. The rope anchor of claim 1 wherein at least one sharp corner has a sharp point.

5. The rope anchor of claim 1 wherein the tip is generally triangular with at least two sharp corners.

6. The rope anchor of claim 1 wherein the tip slot has an inner wall that the tip abuts.

7. The rope anchor of claim 1 wherein the tip and tip slot are keyed.

8. The rope anchor of claim 1 further comprising a textured grip on an outer edge of the hook.

9. The rope anchor of claim 8 wherein the grip includes lateral depressions on the outer edge of the hook.

10. The rope anchor of claim 1 wherein the body includes weight-saving regions.

11. The rope anchor of claim 1 further comprising a through curved slot adjacent to the outer edge of the hook.

12. The rope anchor of claim 1 wherein an inner edge of the hook has a rib.

13. The rope anchor of claim 1 further comprising an elongated rope slot adjacent to an outer edge of the spine, the rope slot having a distal end adjacent to the rope end and a proximal end adjacent to the hook.

14. The rope anchor of claim 13 wherein the rope slot proximal end is narrower than the rope slot distal end.

15. The rope anchor of claim 13 wherein the surface of the rope slot distal end is rounded.

16. The rope anchor of claim 13 wherein the rope slot has an open side with a gate, the gate having a closed position wherein the gate spans the open side and an open position wherein the rope slot is accessible through the open side.

17. The rope anchor of claim 16 wherein the gate is spring biased in the closed position.

* * * * *